United States Patent [19]

Lay

[11] Patent Number: 5,452,672
[45] Date of Patent: Sep. 26, 1995

[54] MULTIPLE EARTH AUGER AND FERTILIZER DISPENSING APPARATUS

[76] Inventor: William M. Lay, 7965 Silverton Ave., Ste. 1301, San Diego, Calif. 92126

[21] Appl. No.: 200,141

[22] Filed: Feb. 23, 1994

[51] Int. Cl.$^6$ ................................................. A01C 15/00
[52] U.S. Cl. .................. 111/93; 111/95; 172/22
[58] Field of Search .................. 111/93, 95, 97, 111/100, 115, 116, 109, 112, 901, 902; 172/21, 22

[56] References Cited

U.S. PATENT DOCUMENTS

| | | | |
|---|---|---|---|
| 1,306,547 | 6/1919 | Lyon | 111/89 X |
| 3,109,393 | 11/1963 | Dion | 172/22 |
| 3,695,193 | 10/1972 | Maier | 111/93 |
| 4,133,274 | 1/1979 | Orth et al. | 172/22 |
| 4,476,938 | 10/1984 | McKay | 172/22 |
| 4,751,971 | 6/1988 | Thompson | 111/116 |
| 5,063,863 | 11/1991 | Peterson | 111/93 |

FOREIGN PATENT DOCUMENTS

| | | | |
|---|---|---|---|
| 225763 | 4/1909 | Germany | 111/89 |
| 1436909 | 11/1988 | U.S.S.R. | 111/89 |

Primary Examiner—Dennis L. Taylor
Assistant Examiner—Spencer Warnick
Attorney, Agent, or Firm—John R. Duncan; Frank D. Gilliam

[57] ABSTRACT

An apparatus for simultaneously drilling multiple holes in the earth in a selected pattern and dispensing a selected quantity of fertilizer into each hole. A support adapted to be carried by a vehicle, such as a farm tractor, carries two frameworks parallel to the vehicle track and selectively spaced from the vehicle track centerline. Each framework carries a carriage on which plural drilling assemblies are mounted. The positions of the drilling assemblies relative to each other is adjustable. The carriage is vertically moveable to allow the drilling assemblies to simultaneously drill plural holes. A dispensing assembly on the framework includes an adjustable metering device for dispensing a selected quantity of fertilizer into each hole.

30 Claims, 4 Drawing Sheets

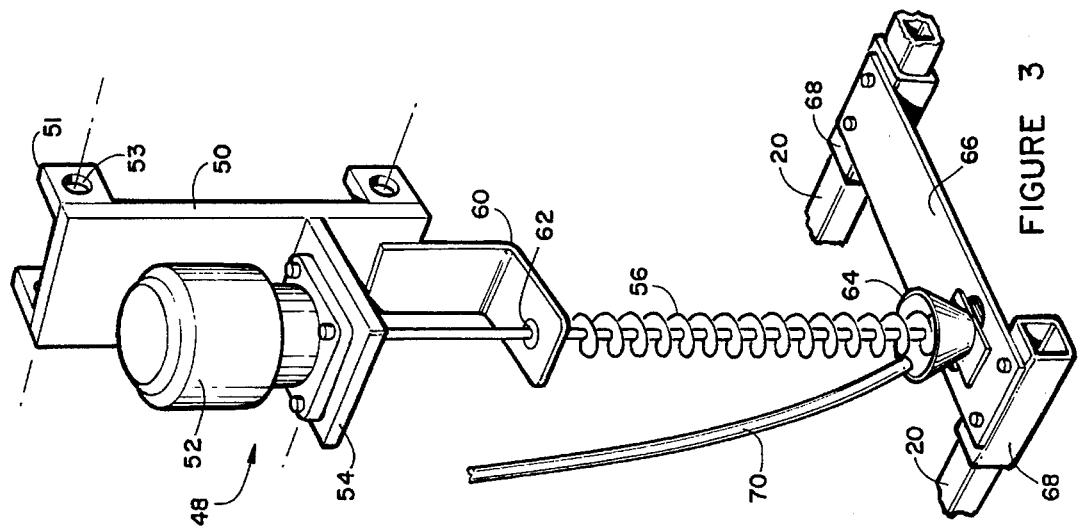
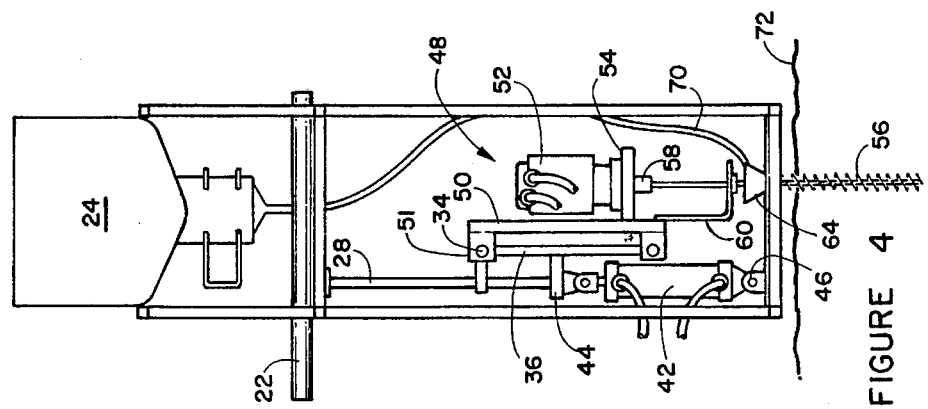
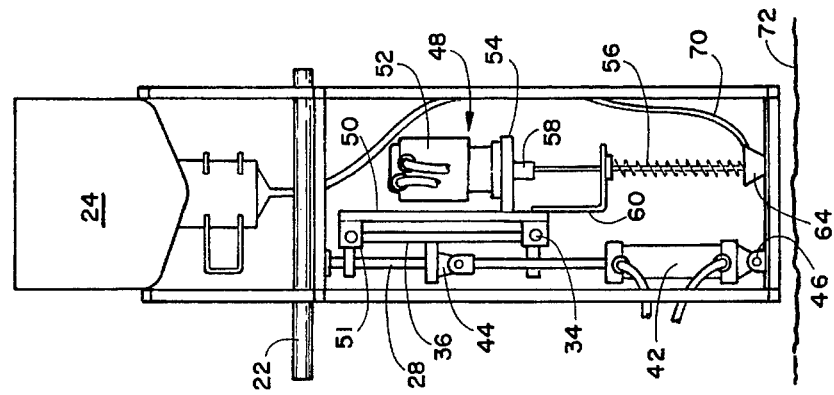

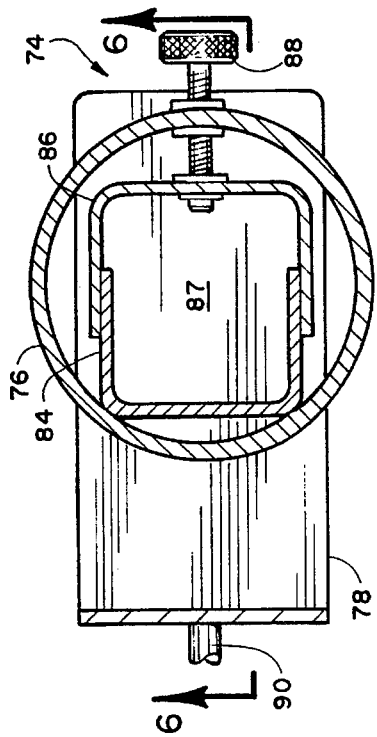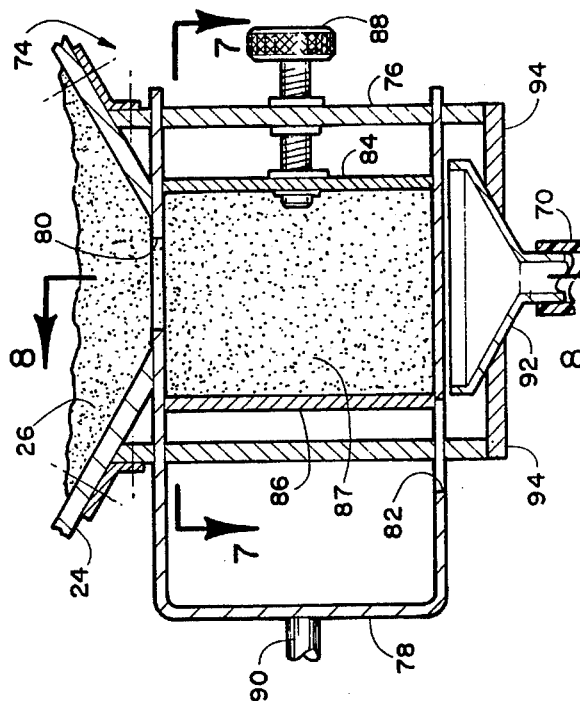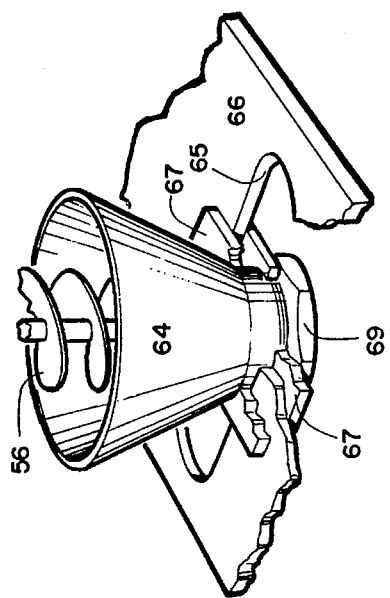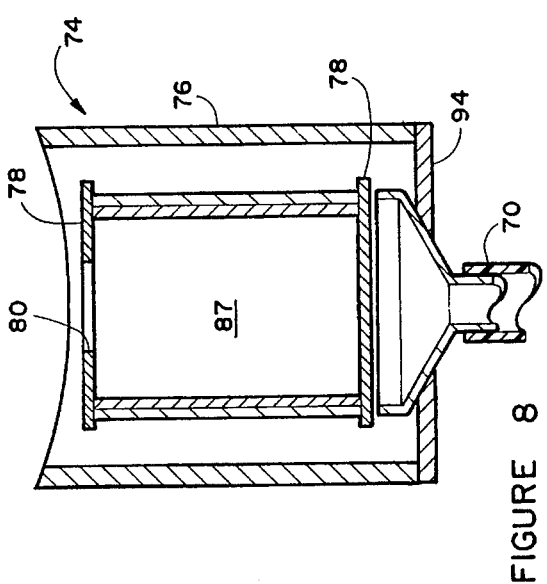

MULTIPLE EARTH AUGER AND FERTILIZER DISPENSING APPARATUS

BACKGROUND OF THE INVENTION

This invention relates in general to apparatus for drilling holes in the earth and dispensing fertilizer into the holes and, more particularly, to such an apparatus having multiple augers and dispensing devices capable of rapidly drilling multiple holes in a selected pattern and dispensing a selected quantity of fertilizer or other plant-aiding material into each hole.

A number of devices and methods of fertilizing plants, in particular trees, in which a hole is drilled in the soil and a quantity of fertilizer or the like is dropped in the hole have been developed and marketed.

Manually operated fertilizer injectors, such as that described by Keyser et al. in U.S. Pat. No. 3,014,443, utilize a hollow rod which is pushed into the ground with the tube closed. Then the tube is opened, such as by withdrawing a plug from within the tube, and a quantity of fertilizer is dropped through the tube into the hole. While simple and inexpensive, such devices are capable of only forming shallow holes and have considerable difficulty with hard ground. Dispensing a reasonably precise amount of fertilizer is difficult and cannot be easily and accurately varied.

Peterson, in U.S. Pat. No. 5,063,863, describes a somewhat more versatile tool for forming a hole and dispensing fertilizer thereinto. A motor-driven auger and a fertilizer container are mounted on a conventional hand-truck carrier. The auger passes through a guide tube above the ground as it drills a hole in the earth. Fertilizer is directed into the guide tube from a side tube connected to the fertilizer container after a hole is drilled and the auger is withdrawn into the guide tube. A rotary measuring device dispenses uniform amounts of fertilizer into each hole. While effective for small scale work, this unit must be manually moved from place to place and can only drill one hole at a time. Further, the measuring device cannot be easily changed to dispense different preselected amounts of fertilizer.

Other manually moved fertilizing apparatus using a powered drilling device and a tube to deliver a quantity of fertilizer into a drilled hole are described by Maier in U.S. Pat. No. 3,695,193 and Gathercoal in U.S. Pat. No. 2,718,856. These devices also require manual movement from place to place and can only drill one hole at a time.

Dion in U.S. Pat. No. 2,109,393 discloses a lawn aerating and fertilizing machine which gangs four powered augers together, all penetrating through a fertilizer bin and funnel shaped guide tubes. The funnels are raised above the ground during drilling and lowered in alignment with drilled holes and the drills are reversed to fill the holes with fertilizer. This assembly can drill and fill shallow holes for fertilizing lawns, but is not effective for fertilizing trees and other large plants, where deep holes each receiving a relatively small quantity of fertilizer are required. Further, while the assembly is being moved from place to place, fertilizer is likely to leak out down the helical drill bits. The amount of fertilizer dispensed can at best be poorly controlled, depending mainly on the depth of the hole. The spacing between drill augers is fixed, so that no adjustment is possible for differing conditions.

A variety of metering devices have been developed for dispensing uniform quantities of powdered or granular materials. Typical of these are the metering systems described by Weitzner in U.S. Pat. No. 3,204,833 and Hafner in U.S. Pat. No. 4,611,731. While the amounts dispensed with each operation of the metering devices are reasonably uniform and consistent, these devices do not include any arrangement for selecting the quantity to be dispensed at different times or under different conditions.

Thus, there is a continuing need for improved apparatus for drilling holes in the earth and dispensing a selected quantity of fertilizer or the like into the holes which can rapidly drill a number of holes while dispensing selected quantities of material into holes spaced selected distances apart. These characteristics are particularly important when fertilizing or treating trees and other large plants, where the hole spacing and fertilizer quantities needed will vary with the size and species of the plant, weather conditions, time of year, etc.

SUMMARY OF THE INVENTION

The above-noted problems, and others, are overcome in accordance with this invention by a multiple earth auger and fertilizer dispensing apparatus which basically includes a support means adapted to be carried by a suitable vehicle, such as a conventional farm tractor, at least one (preferably two) frameworks mounted on the support means in a manner permitting selective horizontal positioning of the frameworks (preferably in a direction substantially perpendicular to the vehicle track), a carriage means mounted on each framework for vertical movement relative therto, at least two drilling means for drilling holes in the earth mounted on each carriage for vertical movement therewith, the drill mounts permitting selective positioning of the drills with respect to each other. Also included is a dispensing means including a hopper for holding a quantity of fertilizer and a metering means for dispensing a selected quantity of fertilizer into each hole after the hole is drilled.

For the purposes of this invention "fertilizer" will be understood to include any agent that is beneficial to plants, in particular trees and other large plants. Fertilizer includes agents that promote growth of plants, pesticides that inhibit or kill various deleterious pests including insects, diseases, etc., agents that promote growth of fruit, flowers or the like, including genetically engineered agents, etc. Powdered or granular materials are preferred for ease of handling and metering.

The apparatus of this invention is particularly useful in fertilizing trees in orchards or the like, with the vehicle proceeding between rows of trees with the transverse spacing between frameworks and longitudinal spacing between drilling means selected to drill holes and provide fertilizer at the optimum locations, depths and quantities for trees depending on species, season and other conditions.

It is, therefore, an object of this invention to provide a powered earth auger and fertilizer dispensing system capable of rapidly producing a number of fertilized holes at selected locations. Another object is to provide a fertilizing system for producing rows of fertilized holes at selected with adjustable spacing between the hole rows. A further object is to provide a fertilizing system capable of producing fertilized holes on accurate, selected, longitudinal spacings between adjacent drill devices in each row. Yet another object is to provide a fertilizing system in which the amount of fertilizer to be dispensed into each of a number of holes can be precisely selected and uniformly dispensed.

BRIEF DESCRIPTION OF THE DRAWING

Details of the invention, and of preferred embodiments thereof, will be further understood upon reference to the drawing, wherein:

FIG. 3 is a perspective view of the drill and related dispensing components;

FIG. 4 is an elevation view showing the drill assembly of FIG. 3 in the drilling position;

FIG. 5 is an elevation view showing the drill assembly of FIG. 3 in the fertilizer dispensing position;

FIG. 6 is a section view of the dispenser metering system, taken on line 6—6 in FIG. 7;

FIG. 7 is a section view of the dispenser metering system taken on line 7—7 in FIG. 6;

FIG. 8 is a section view of the dispenser metering system taken on line 8—8 in FIG. 6; and FIG. 9 is a detail perspective view of the dispenser funnel adjustment arrangement.

DETAILED DESCRIPTION OF PREFERRED EMBODIMENTS

Figure 1:
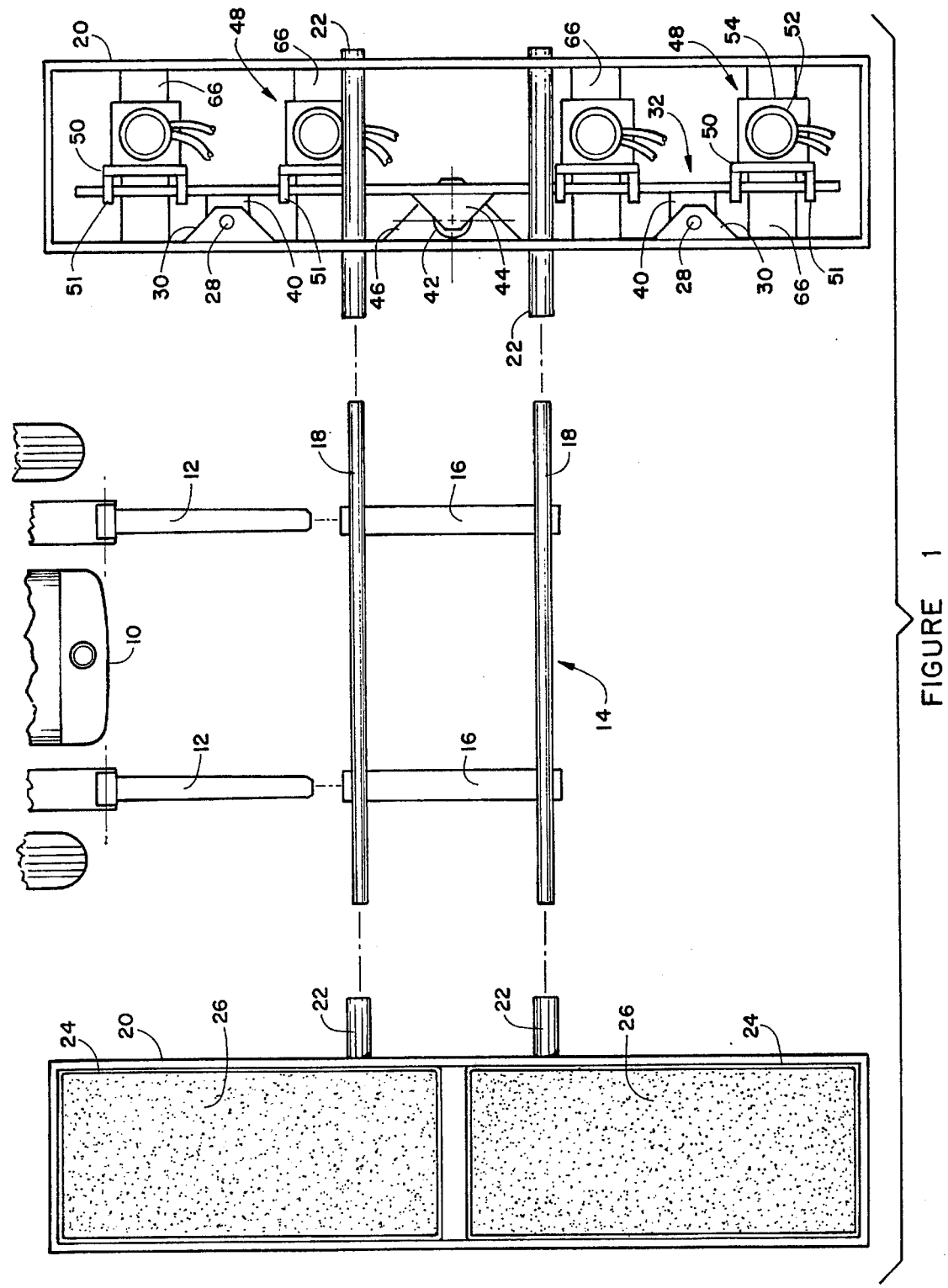
FIG. 1 is an exploded plan view of the overall apparatus of this invention.

As seen in FIG. 1, the overall system includes a vehicle 10, such as a conventional farm tractor, for carrying and moving the earth auger and fertilizer dispensing devices. Vehicle 10 includes conventional powered fork lift type tines 12 extending in the direction of travel. Any other suitable vehicle may be used, if desired.

A support means 14 includes two box section receivers 16 sized to slidably fit over tines 12. While not usually necessary, means may be provided to lock receivers 16 to tines 12 during operation of the system, if desired. Two tubular cross pieces 18 are secured to receivers 16 such as by welding. While tubes 18 preferably extend perpendicular to the track of tractor 10, they may extend in different directions, if desired.

A pair of frameworks 20 include tubes 22 which telescope over tubes 18 so that frameworks 20 are carried by support 14 while allowing the spacing between frameworks to be varied. Tubes 22 are secured to frameworks 20 in any suitable manner, such as by welding. The frameworks carry hoppers 24 holding the material 26 to be dispensed. Hoppers 24 are omitted from the right-hand framework 20 in FIG. 1 to allow the internal components to be seen. After frameworks 20 are positioned relative to each other, tubes 22 are locked to tubes 18 by any suitable means, such as setscrews.

Figure 2:
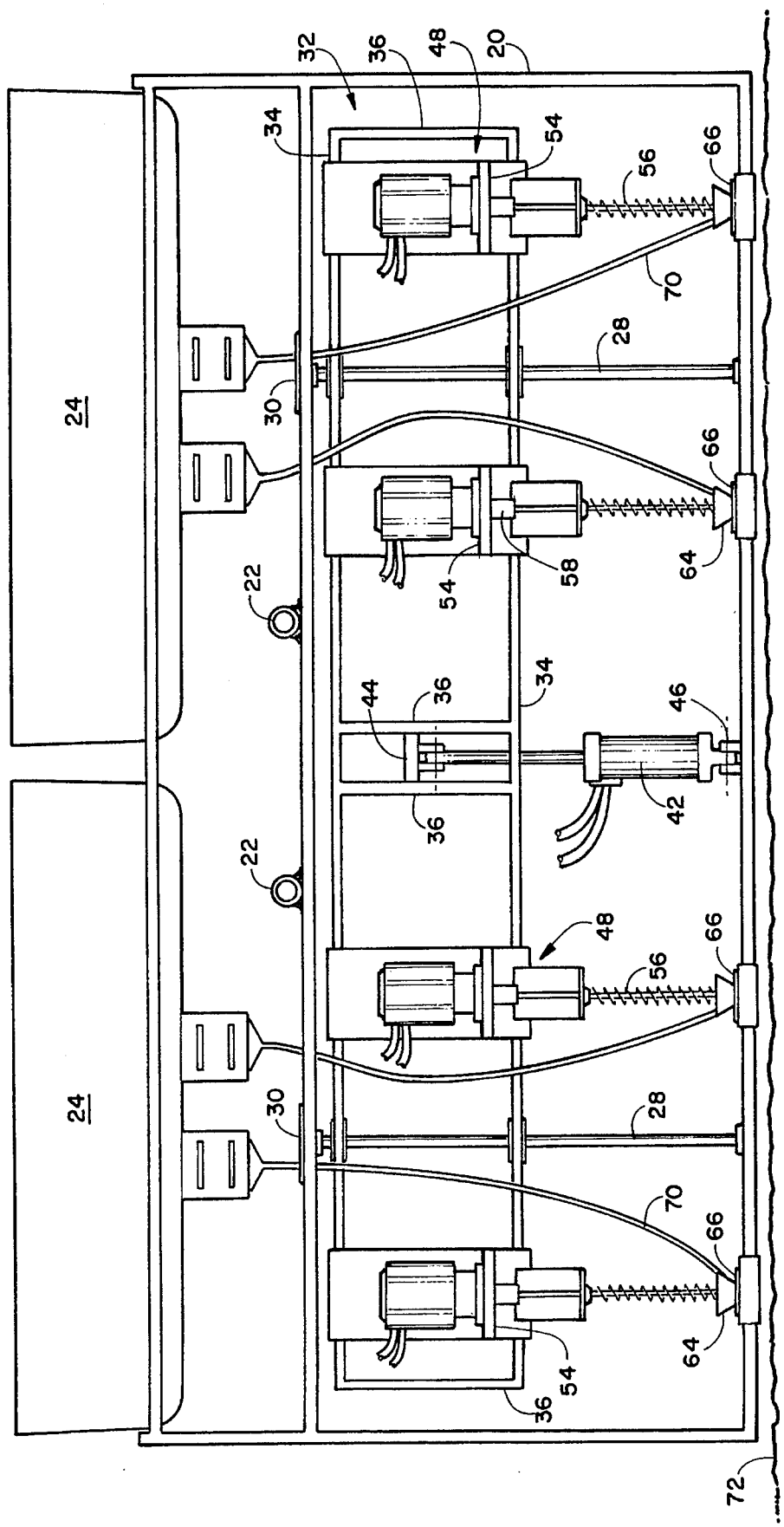
FIG. 2 is a side elevation view of one drill and dispenser supporting framework.

As seen in FIGS. 1 and 2, framework 20 is a generally open box frame supporting hoppers 24 at the top and having two vertical rods 28 secured to brackets 30 therein. A carriage 32 having two long rods 34 interconnected by short rods 36 is slidable along framework rods 28 through bearings 38 on brackets 40. Carriage is moved upwardly and downwardly by a conventional hydraulic cylinder 42 connected between bracket 44 secured to central cross pieces 36 and bracket 46 secured to framework 20. While two hoppers 24 are shown, if desired a single large hopper with one or more dispensing means 76 as seen in FIGS. 6–8 may be used.

While a single carriage 32 is shown mounted on each framework 20 and moved by a single hydraulic cylinder 42, if desired two or more carriages, each carrying one or more auger assemblies, may be used with a separate hydraulic cylinder powering each carriage. Carriages carrying pairs of augers with a hydraulic cylinder therebetween are particularly convenient for some applications.

Drill assemblies 48 are each supported on a base 50 having blocks 51 with 53 holes (as seen in FIG. 5) through which long rods 34 slidably extend. Once each drilling assembly is slid along rods 34 to the desired position, it is locked in place by any conventional means, such as setscrews (not shown). Each drill motor 52 is secured to a plate 54 extending out from each channel 50.

Details of drill assembly 48 are shown in FIG. 3. A drill bit or auger 56 is mounted on drill motor by a conventional chuck 58. Auger 56 is preferably of the type conventionally used for drilling soft materials such as the earth, having wide, thin, helical threads. An angle bracket 60 with a bearing 62 is preferably included to stabilize auger 56 during drilling.

A short funnel 64 is mounted on a plate 66 fastened to box sections 68 which are slidable along frame 20 so that funnel can be positioned in alignment with auger 56. Plate 66 is secured in the selected position by conventional means, such as setscrews (not shown for clarity). As seen in the detail view of FIG. 9, a slot 65 is provided in plate 66 for minor adjustments of the position of funnel 64. A plate 67 engages funnel 64 above slot 65. The end of funnel 64 is threaded. A loose second plate 67 and a nut are provided to lock funnel 64 in a selected position.

A flexible tube 70 extends from the dispensing means, detailed below, to funnel 64. Tube 70 has sufficient flexibility to remain in funnel 64 when the position of the drill assembly 48 is adjusted along carriage 32 and may be clipped or wired to the edge of funnel 64, if necessary. Where multiple hoppers 24 containing different materials are used, tubes 70 may extend from different dispensing assemblies to a funnel 64 so that different materials may be selected as desired.

FIG. 4 shows drilling assembly 48 at the completion of a drilling operation. Auger 56 extends to the desired depth in earth 72. To drill holes, drill motors 52 are turned on to start augers 56 rotating. Hydraulic cylinder gradually lowers carriage 32, causing the augers to penetrate the earth. The depth of the holes can be selected by controlling the retraction of hydraulic cylinders in a conventional manner.

As seen in FIG. 5, after holes are drilled to the desired depth, hydraulic cylinder 42 retracts auger 56 to a position leaving the top of the drilled hole free. Dirt removed from the hole by auger 56 will pile between the ground level and the lower surface of plate 66.

Details of the adjustable fertilizing dispensing and metering assembly 74 are provided in FIGS. 6–8. A circular housing 76 is secured to hopper 24 by conventional means such as bolts. A channel bracket 78 extends through slots in housing 76. Spaced holes 80 and 82 are provided in the upper and lower legs of bracket 78. Telescoping first and second channel brackets 84 and 86 are provided within housing 76. Bracket 84 is secured to housing 76, such as by brazing, welding or the like. An adjustment bolt 88 is threaded through housing 76 and is rotatably secured to second bracket 86 so that rotation of adjustment bolt 88 moves second bracket 86 to increase or decrease the volume within the metering chamber 87 formed by brackets 84 and 86. Channel 78 can be moved by actuator 90 to bring either hole 80 or hole 82 into alignment with metering chamber 87.

In operation, actuator 90 is initially moved to the leftmost position as seen in FIG. 6 by any suitable means, such as a small hydraulic cylinder, an electrical solenoid or the like. This allows fertilizer from hopper 24 to fill metering chamber 87, with the chamber adjusted with adjustment bolt 88 to provide the selected amount of fertilizer for the hole. After the holes are formed by the drilling assembly and the auger has returned to the position shown in FIG. 5, each actuator 90 is moved to the left as seen in FIG. 6 to move hole 80 out of alignment with metering chamber 87 and to bring hole 82 into position between chamber 87 and funnel 92 mounted on housing 76 by brackets 94. This allows material 26 in chamber 87 to drain through funnel into flexible tube 70, through funnel 64 as seen in FIG. 5 and into the newly drilled hole. Actuator 90 then moves channel 78 back to the position shown in FIG. 6, metering chamber 87 refills and is ready for the next dispensing operation.

Thus, it is apparent that this apparatus provides a highly adjustable assembly for drilling selectively spaced holes in the earth and dispensing a selected amount of fertilizer to the holes at a high rate and with greater accuracy.

While certain preferred materials, dimensions and arrangements have been detailed in conjunction with the above description of preferred embodiments, those can be varied, where suitable, with similar results. Other applications, variations and ramifications of this invention will occur to those skilled in the art upon reading this disclosure. Those are intended to be included within the scope of this invention as defined in the appended claims.

I claim:

1. A multiple earth auger and fertilizer dispensing apparatus which comprises:

a support means adapted to be carried by a vehicle;

at least one framework mounted on said support means for selective positioning relative thereto in a generally horizontal direction;

a carriage means mounted on said framework for movement relative thereto in a generally vertical direction;

at least two drilling means mounted on said carriage means including drill augers for drilling approximately parallel spaced holes in the earth as said carriage means is moved downwardly;

means for varying the positions of said drilling means relative to each other along said carriage; and dispensing means associated with each drilling means for dispensing a selected quantity of fertilizer into holes formed by said drilling means.

2. The apparatus according to claim 1 wherein said support means comprises mounting means for securing said support means to a vehicle and transverse telescoping members attached to said mounting means and connected to said at least one framework whereby said framework can be moved toward and away from the vehicle movement direction centerline.

3. The apparatus according to claim 2 wherein two of said frameworks are mounted on said telescoping members on opposite sides of said vehicle movement direction centerline whereby the positions of the frameworks relative to each other and to said vehicle movement direction centerline can be adjusted.

4. The apparatus according to claim 3 wherein one carriage means carrying four spaced drilling means is mounted on each of said frameworks.

5. The apparatus according to claim 1 wherein said framework includes a plurality of vertical rods and said carriage means is mounted on brackets which include a plurality of bearings surrounding said rods for vertical movement of said carriage therealong.

6. The apparatus according to claim 5 wherein said framework further includes powered means for moving said carriage upwardly and downwardly along said vertical rods.

7. The apparatus according to claim 6 wherein said powered means comprises at least one hydraulic cylinder extending between said framework and said carriage means.

8. The apparatus according to claim 1 wherein said means for varying the positions of said drilling means relative to each other comprises drilling means mounts, horizontal holes in said drilling means mounts cooperating with horizontal rods on said carriage means to permit said drilling means mounts to be moved along said horizontal rods and secured in selected positions relative to each other.

9. The apparatus according to claim 1 wherein said dispensing means includes hoppers for holding fertilizer to be dispensed mounted at the top of said frameworks.

10. The apparatus according to claim 9 wherein said dispensing means includes an adjustable measuring means for receiving said fertilizer from a hopper and providing said selected quantity of fertilizer to each hole.

11. The apparatus according to claim 10 wherein said dispensing means includes tubes for conveying said fertilizer from said measuring means to said hole.

12. The apparatus according to claim 11 further including funnels coaxial with each of said drill augers, secured to the lower portion of said framework and positioned below the end of said drill augers when drilling is not underway, for guiding said drill augers during drilling and for receiving fertilizer from said tubes and directing said fertilizer into said holes.

13. The apparatus according to claim 11 wherein said measuring means includes a container for receiving fertilizer from said hopper and for holding a selected quantity to be dispensed, adjustment means for adjusting the volume of said container and actuator means to selectively admit fertilizer from said hopper into said container and for dispensing said fertilizer from said container to said holes.

14. The apparatus according to claim 13 wherein said container is bounded by two generally U-shaped, telescoping walls, the degree of telescoping of which is adjustable to adjust the volume of said container, and by top and bottom interconnected slidable plates, said plates having offset top inlet and bottom outlet openings therethrough whereby said interconnected plates may be positioned to either allow entrance of fertilizer into said container through said top opening or allow exit of said fertilizer from said container through said bottom opening.

15. A multiple earth auger and fertilizer dispensing apparatus which comprises:

a support means adapted to be carried by a vehicle;

two frameworks mounted on said support means on opposite sides of the centerline of normal vehicle travel, for movement relative thereto in a generally horizontal direction;

a carriage means mounted on each of said frameworks for generally vertical movement relative thereto;

at least two drilling means mounted on each of said carriage means including drill augers for vertical movement between a withdrawn first position and a second position for drilling approximately parallel spaced holes in the earth as said carriage means is moved downwardly;

means for varying the horizontal positions of said drilling means relative to each other; and dispensing means associated with each drilling means for dispensing a selected quantity of fertilizer into holes formed by said drilling mean.

16. The apparatus according to claim 15 wherein said support means by drilling means mounts and comprises brackets extending in the direction of normal vehicle travel and transverse telescoping members connected to said frameworks whereby each of said frameworks can be moved toward and away from the vehicle movement direction centerline.

17. The apparatus according to claim 15 wherein one carriage means carrying four spaced drilling means is mounted on each of said frameworks.

18. The apparatus according to claim 15 wherein each of said frameworks includes a plurality of vertical rods and said carriage means includes a plurality of bearings surrounding said rods for vertical movement of said carriage therealong.

19. The apparatus according to claim 18 wherein each of said frameworks further includes powered means for moving said carriage upwardly and downwardly along said vertical rods.

20. The apparatus according to claim 19 wherein said powered means comprises at least one hydraulic cylinder extending between said framework and said carriage means.

21. The apparatus according to claim 15 wherein said means for varying the positions of said drilling means relative to each other comprises horizontal holes in the drilling means mounts cooperating with horizontal rods on said carriage means to permit said drilling means mounts to be moved along said horizontal rods and secured in selected positions relative to each other.

22. The apparatus according to claim 15 wherein said dispensing means includes hoppers for holding fertilizer to be dispensed mounted at the top of said frameworks.

23. The apparatus according to claim 22 wherein said dispensing means includes an adjustable measuring means for providing said selected quantity of fertilizer to each hole.

24. The apparatus according to claim 23 wherein said dispensing means includes tubes for conveying said fertilizer from said measuring means to said hole.

25. The apparatus according to claim 24 further including a funnel coaxial with each of said drill augers, secured to the lower portion of said framework below the end of said drill augers when said drills are in the first, withdrawn, position, for guiding said drill augers during drilling and for receiving fertilizer from said tubes and directing said fertilizer into said holes.

26. The apparatus according to claim 15 wherein said measuring means including a container for a selected quantity to be dispensed, adjustment means for adjusting the volume of said container and actuator means to selectively admit fertilizer into said container and for dispensing said fertilizer from said container.

27. The apparatus according to claim 26 wherein said container is bounded by two generally U-shaped, telescoping walls, the degree of telescoping of which is adjustable to adjust the volume of said container, and by top and bottom interconnected slidable plates, said plates having offset top inlet and bottom outlet openings therethrough whereby said interconnected plates may be positioned to either allow entrance of fertilizer into said container through said top opening or allow exit of said fertilizer from said container through said bottom opening.

28. A method of simultaneously drilling multiple holes in the earth and dispensing selected quantities of fertilizer in each drilled hole which comprises the steps of:

mounting at least two frameworks on opposite sides of a vehicle track;

positioning said frameworks at selected distances from said track of said vehicle;

mounting a carriage carrying at least two vertically oriented drilling assemblies on each framework for vertical movement relative thereto;

moving said carriage downwardly while activating said drilling assemblies to simultaneously drill plural holes in the earth;

retracting said carriage and drill assemblies;

metering selected quantities of fertilizer; and dispensing a selected quantity of fertilizer into each hole after drilling is completed.

29. The method according to claim 28 further including the step of adjusting the positions of said drilling means along said carriage.

30. The method according to claim 28 where said dispensing step comprises adjusting the size of a metering chamber, directing fertilizer from a storage hopper into an inlet opening into said chamber simultaneously closing said inlet opening and opening an outlet opening from said chamber and guiding fertilizer from said outlet opening to said hole after drilling is complete.

* * * * *